Figure 1:
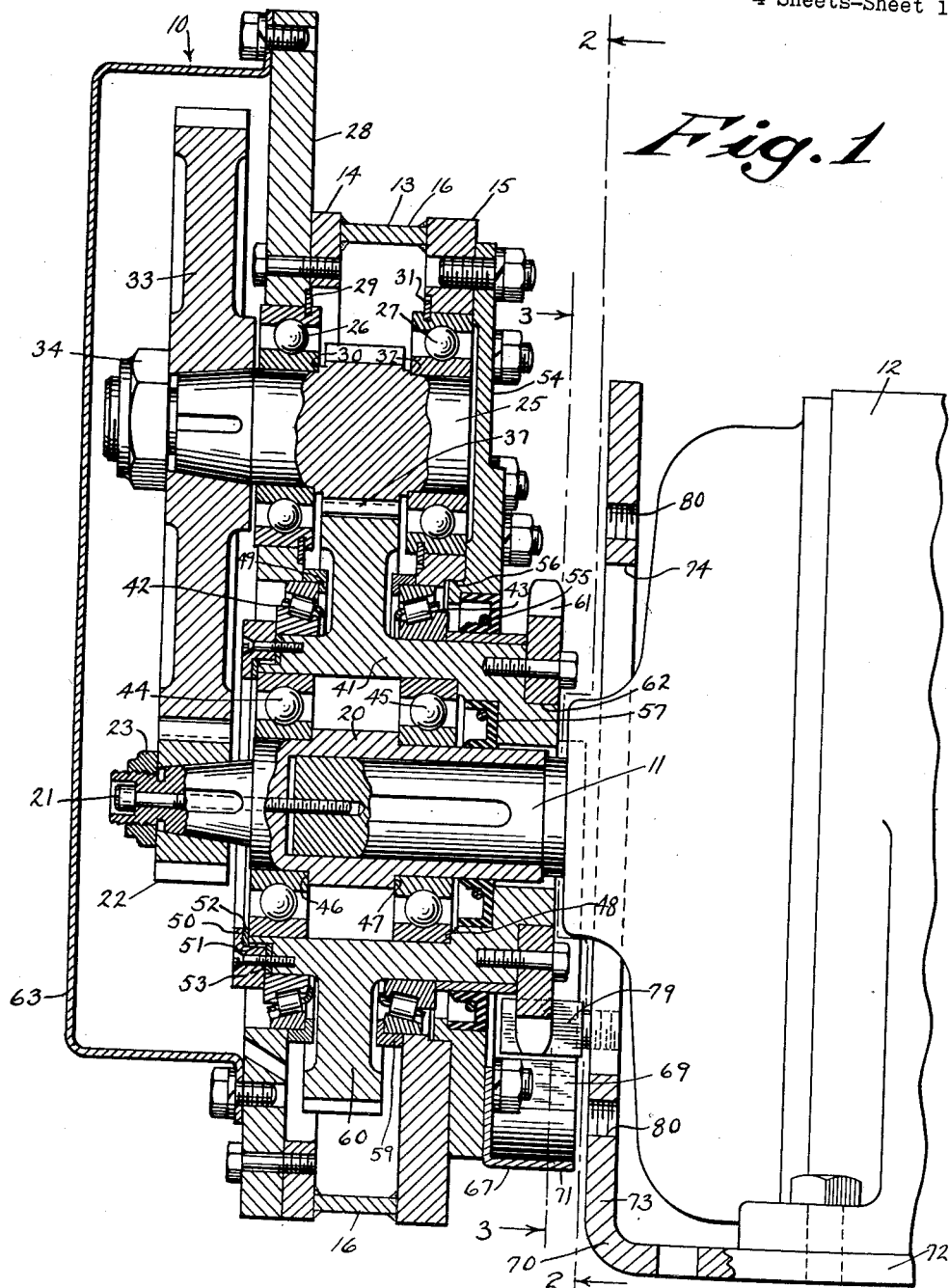

June 1, 1965 W. P. SCHMITTER 3,187,209
MOTOR SHAFT MOUNTED SPEED REDUCER
Filed June 21, 1961 4 Sheets-Sheet 3

INVENTOR
WALTER P. SCHMITTER, deceased,
by A. LOUISE SCHMITTER
and ROBERT V. ABENDROTH,
CO-EXECUTORS, BY Adrian L. Bateman, Jr.
ATTORNEY

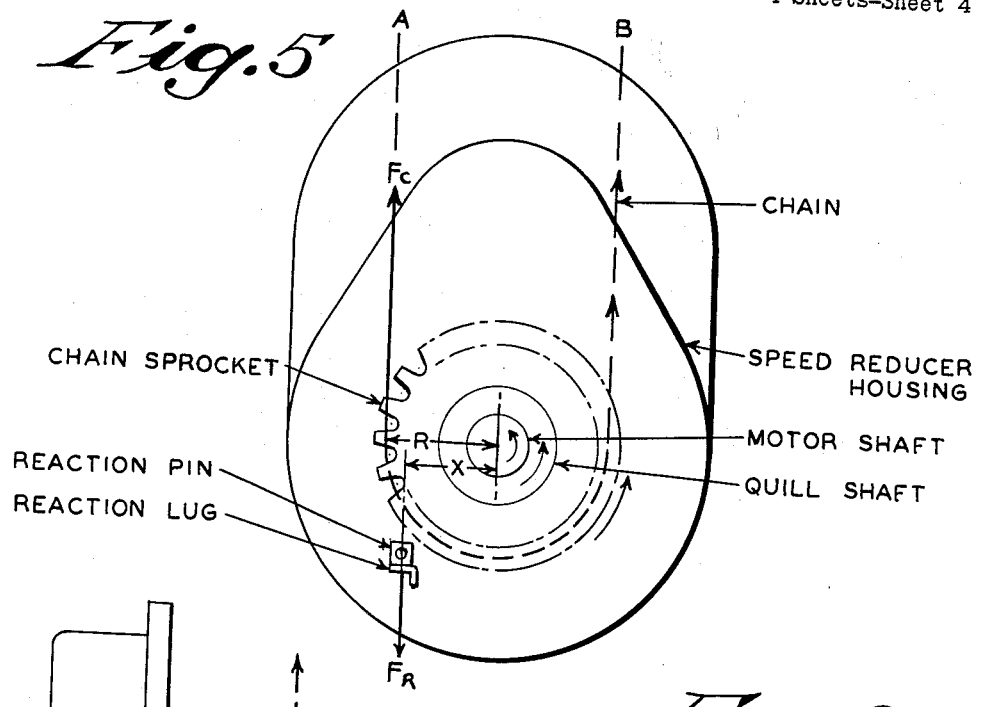
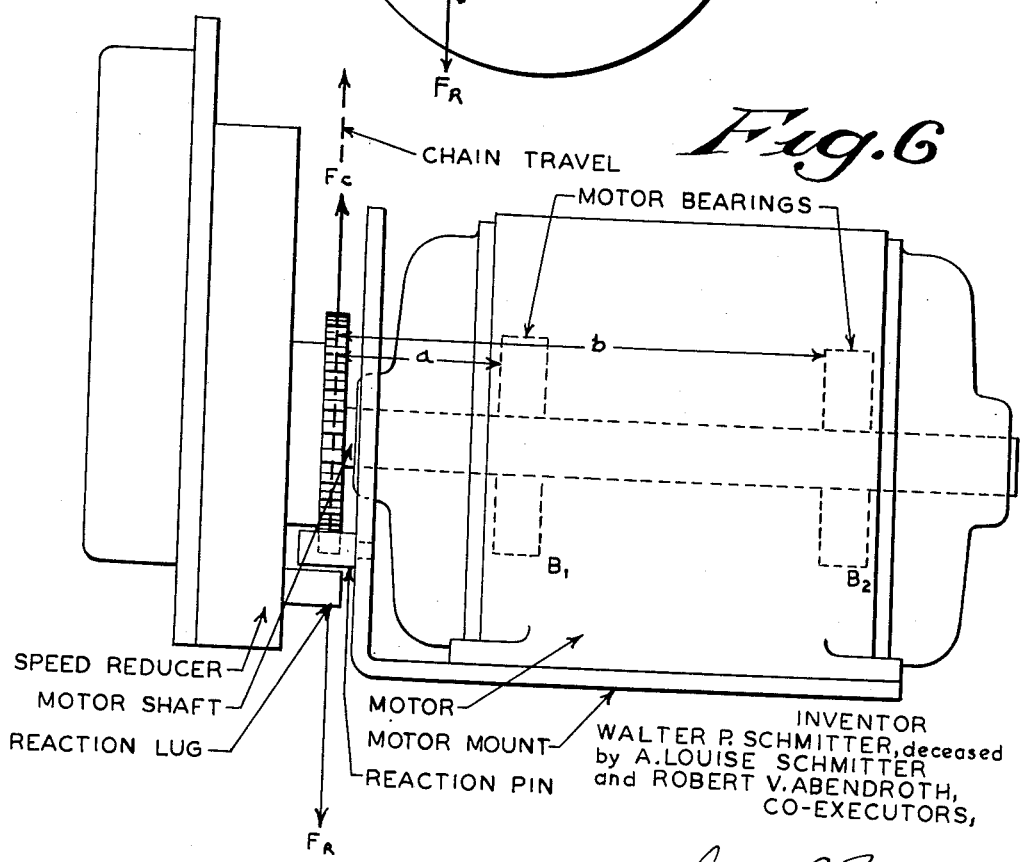

United States Patent Office 3,187,209
Patented June 1, 1965

3,187,209
MOTOR SHAFT MOUNTED SPEED REDUCER
Walter P. Schmitter, deceased, late of Wauwatosa, Wis., by A. Louise Schmitter, Wauwatosa, and Robert V. Abendroth, Whitefish Bay, Wis., co-executors, assignors to The Falk Corporation, Milwaukee, Wis., a corporation of Wisconsin
Filed June 21, 1961, Ser. No. 118,743
19 Claims. (Cl. 310—83)

This invention relates to speed reducers and, more particularly, to speed reducers which are adapted to be mounted on the output shaft of a prime mover or motor.

This invention provides, for the first time, means by which a speed reducer may be mounted directly on the output shaft of a motor. Heretofore, it has been considered impractical to mount a speed reducer directly on the output shaft of a prime mover, such as an electric motor, due to the large dynamic forces that are developed during operation of the motor-speed reducer combination, which forces impose loads in excess of the design stress limitations of the motor's output shaft and its supporting structure. In consequence of these kinematic forces, it is now general practice to mount a speed reducer on the input shaft of driven machinery which is normally capable of withstanding higher dynamic loads than a motor output shaft, or on a floor or similar firm foundation. In contra-distinction to these prior art methods of mounting speeds reducers, this invention contemplates mounting a speed reducer directly on a motor output shaft by a unique utilization of torque reaction forces developed during the operation of the speed reducer.

Accordingly, one of the principal objects of this invention is to provide for mounting a speed reducer directly on the output shaft of a prime mover without imposing excessive dynamic loads on the bearings and shaft of the prime mover.

Another object of this invention is to provide a gear type speed reducer which may be mounted on the output shaft of a motor without imposing loads on the motor shaft and bearings that exceed the stress limitations of said shaft and bearings.

A further object of this invention is to provide a speed reducer which many be mounted directly on a motor output shaft and which has torque reaction localizing means arranged to substantially counterbalance the output force developed by the speed reducer and thereby prevent dynamic loading of the motor shaft on which the speed reducer may be mounted in excess of the load limitations of the shaft.

A still further object of this invention is to provide a power transmission including a motor and a speed reducer wherein the speed reducer is mounted directly on the output shaft of the motor and which has torque reaction localizing means arranged to localize dynamic forces so that the motor shaft and bearings will not be subjected to excessive loads during operation of the power transmission.

The objects of this invention are accomplished by selectively arranging torque reaction localizing means to localize the torque reaction forces exerted on the housing of a speed reducer mounted on a motor output shaft during operation so as to substantially counter-balance the output force from the speed reducer and thereby prevent excessive loading of the motor output shaft and its supporting structure.

The foregoing and other objects will appear in the description to follow. In the description, reference is made to the accompanying drawings which form a part hereof and in which there is shown by way of illustration and not of limitation a specific form in which this invention may be practiced.

Figure 2:
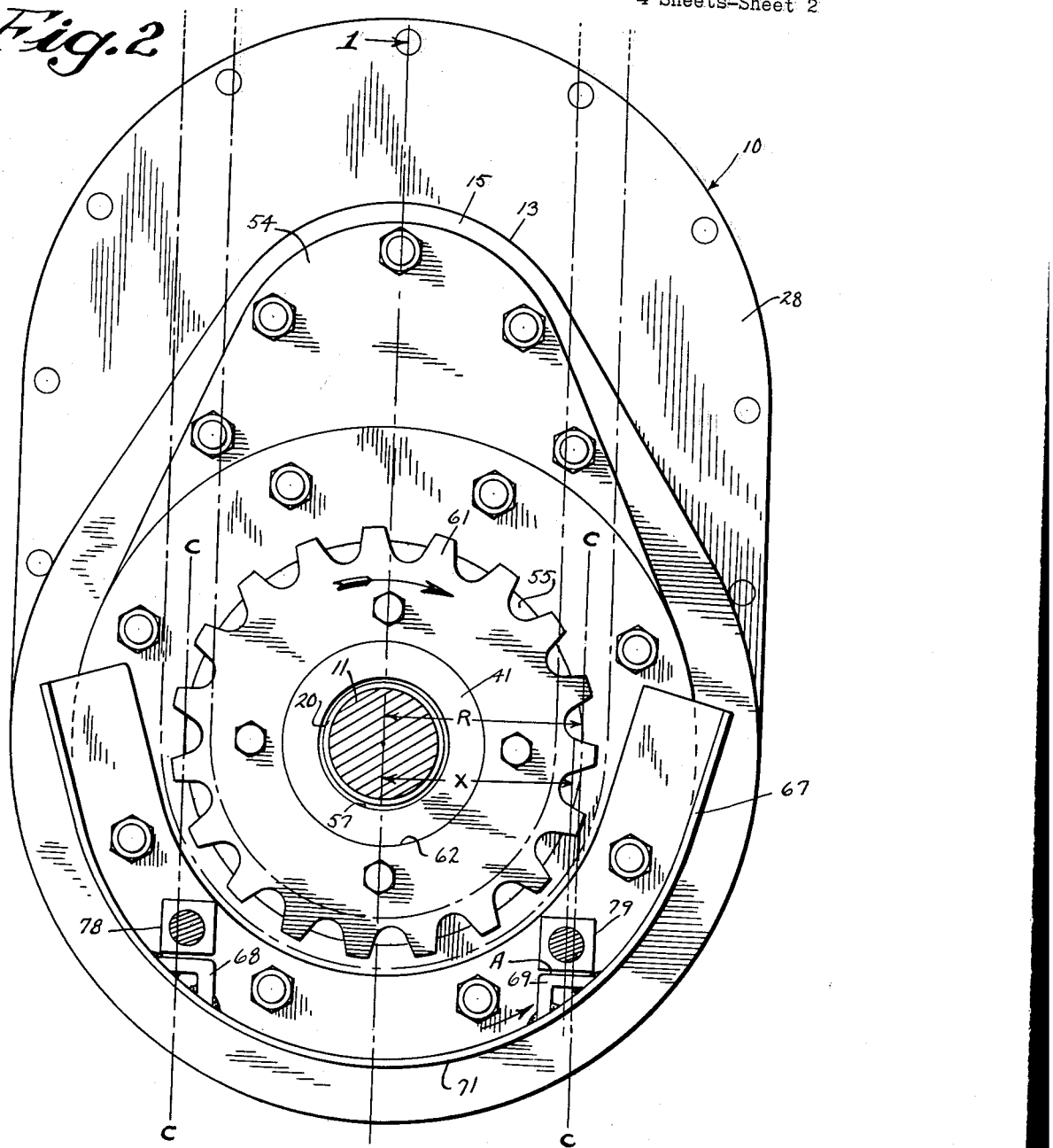
Figure 3:
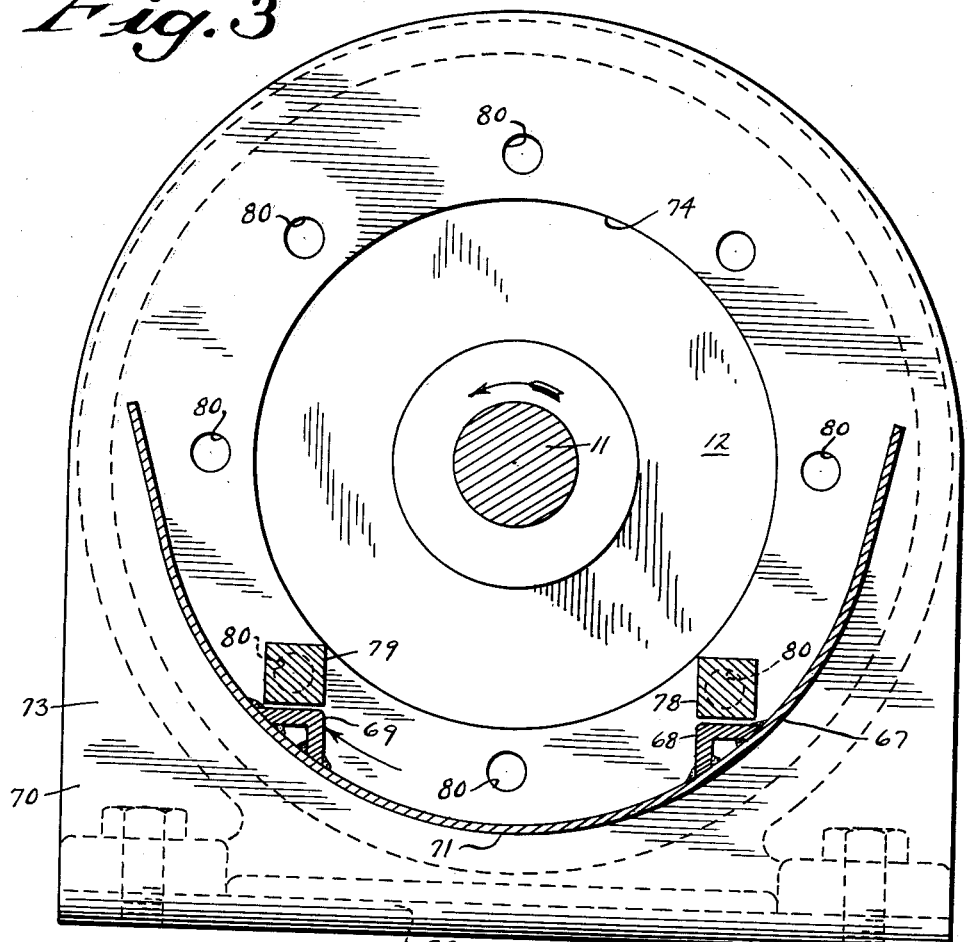
Figure 4:
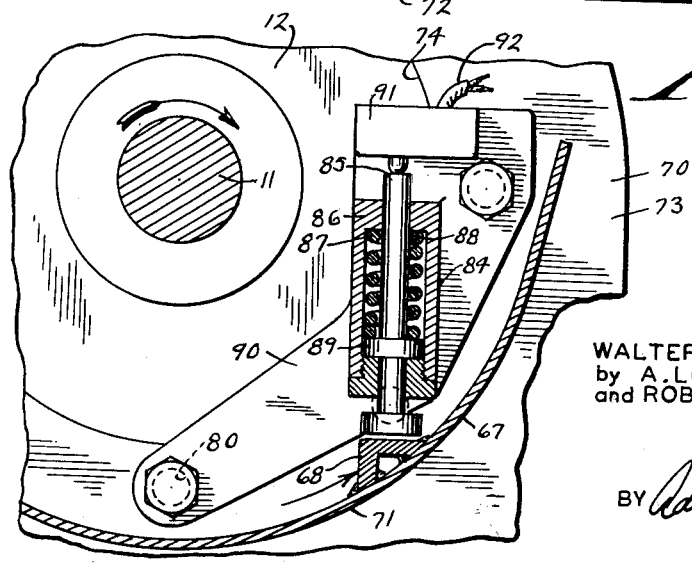

In the drawings:
FIG. 1 is a side view of a speed reducer constructed in accordance with the present invention mounted on the output shaft of an electric motor, with the speed reducer portion shown in sectional view and with parts broken away;
FIG. 2 is a transverse sectional view along the plane of line 2—2 of FIG. 1 looking in the direction of the arrows;
FIG. 3 is a transverse sectional view along the plane of line 3—3 of FIG. 1 looking in the direction of the arrows;
FIG. 4 is a fragmentary sectional view showing an alternate form of a portion of FIG. 3 and is taken along the plane of line 3—3 of FIG. 1;
FIG. 5 is a schematic view similar to FIG. 2;
FIG. 6 is a schematic side view of the motor-speed reducer combination of FIG. 1.

Referring to FIG. 1 there is shown a double-reduction gear type speed reducer 10 mounted on the output shaft 11 of an electric motor 12, the motor being of standard construction and connected to a suitable power source not shown. The housing 13 of the speed reducer 10 includes a front wall 14 and a rear wall 15 that are substantially parallel and axially spaced apart, joined together by a peripheral wall 16, preferably by weldments, to provide a rigid supporting structure for the internal mechanism of the speed reducer.

The internal mechanism of the speed reducer 10 includes a hollow input shaft 20 that is keyed to the motor output shaft 11 and further joined thereto by means of a bolt 21 to permit transmission of rotary motion from the motor output shaft to the hollow input shaft 20. Keyed to the outboard end of the hollow input shaft 20 is a high speed pinion 22 that is held in place by a retaining nut 23. A counter shaft 25 that is parallel to and spaced from the hollow input shaft 20 is journaled in a pair of axially spaced ball bearings 26 and 27. Bearing 26 is mounted in a bearing plate 28 that is bolted to the front wall 14 of the speed reducer housing 13 by means of a plurality of circumferentially spaced bolts and the bearing is retained in its position by a snap ring 29 and a shoulder portion 30 of the counter shaft 25. Bearing 27 is mounted in the rear wall 15 of the housing 13 and retained therein by a snap ring 31 and a shoulder portion 32 of the counter shaft. A high speed gear 33, keyed to the outboard end of the counter shaft 25 and held in place by a retaining nut 34, meshes with the high speed pinion 22. An intermediate portion of the counter shaft 25 is formed to provide a low speed pinion 37.

A quill shaft 41 is journaled in a pair of axially spaced roller bearings 42 and 43, which are mounted in the bearing plate 28 and rear wall 15 of the speed reducer housing respectively. The quill shaft 41 is mounted concentrically with the hollow input shaft 20, and a pair of axially spaced ball bearings 44 and 45 are inserted between the outer surface of the input shaft 20 and the inner surface of the quill shaft 41. The bearings 44 and 45 abut shoulder portions 46 and 47, respectively, of the input shaft 20 along their inner races. The outer race of bearing 45 abuts a shoulder portion 48 formed in the central opening of the quill shaft 41. The outer race of bearing 42 is held in place by an inwardly turned annular flange 49 that is welded to the bearing plate 28 and the outer race of bearing 43 is similarly held in place by an inwardly turned annular flange 59 welded to the rear wall 15. A bearing retainer ring 50 is bolted to the outboard end of quill shaft 41 to restrain the outer ends of bearings 42 and 44, the outboard end of the quill shaft 41 having an annular portion 51 cut out to receive the bearing retainer ring. A pair of shim rings 52 and 53 may be inserted between the bearing retainer ring 50 and the quill shaft as shown in rearranging, $$F_c = \frac{T_o}{R}$$

substituting, $$T_o = T_i \times (G.R.) \quad \text{(Equation 1)}$$

$$F_c = \frac{T_n \times (G.R.)}{R} \quad \text{(Equation 3)}$$

Thus, with a known motor output torque, $T_i$, a speed reducer of a known speed reduction ratio G.R., and a sprocket of pitch radius R, the chain force $F_c$ can be computed from Equation 3.

Turning now to the torque reaction forces, for a speed reducer of the type described above where the low speed gear has a greater diameter than the high speed pinion, the reaction torque, $T_r$, equals the output torque, $T_o$, minus the input torque, $T_i$, or:

$$T_r = T_o - T_i$$

$$T_i = \frac{T_o}{G.R.} \quad \text{(From Equation 1)}$$

substituting, $$T_r = T_o - \frac{T_o}{G.R.} = T_o \left( \frac{G.R. - 1}{G.R.} \right)$$

(Equation 4)

By use of the torque reaction localizing means described above, the reaction torque, $T_r$, is transmitted to the reaction pin and lug to develop therebetween a reaction force, $F_r$, that will have a line of action parallel to the line of action of the chain force $F_c$, but will be in the opposite direction, as shown in FIG. 5. The direction of $F_r$ may be controlled by selectively positioning the surface of the reaction lug which contacts the reaction pin perpendicular to the line of action of $F_c$. The perpendicular distance, X, of $F_r$ from the motor shaft axis will determine the magnitude of $F_r$ in accordance with the following equation:

$$F_r \times X = T_r \quad \text{(Equation 5)}$$

rearranging, $$F_r = \frac{T_r}{X} \quad \text{(Equation 6)}$$

It is possible, therefore, to select a perpendicular position of $F_r$, or X, such that $F_r$ will be equal in magnitude to $F_c$, by use of Equations 2, 5 and 4.

$$T_r = T_o - T_i = T_o \left( \frac{G.R. - 1}{G.R.} \right)$$

(Equation 4)

substituting Equation 2 for $T_o$ and Equation 5 for $T_r$:

$$F_r \times X = F_c \times R \left( \frac{G.R. - 1}{G.R.} \right)$$

(Equation 7)

From Equation 7, if X is chosen to equal $$R \left( \frac{G.R. - 1}{G.R.} \right)$$

$F_r$ will be equal and opposite to $F_c$. Turning now to FIG. 6, if $F_c$ equals $F_r$ there will be no dynamic flexural loading on the motor bearings, indicated schematically as $B_1$ and $B_2$, due to the chain force since $F_c$ and $F_r$, being equidistant from the bearings, will exert equal and opposite bending moments thereon and thereby counterbalance one another. That is, if $F_c = F_r$, then $F_c \times a = F_r \times a$ and $F_c \times b = F_r \times b$.

As a result of localizing the torque reaction forces to counterbalance the chain force by selectively positioning the torque reaction localizing means in accordance with this invention, there will be no increased load on the motor shaft due to the torque multiplication effect of the speed reducer and the speed reducer may then be mounted directly on the motor shaft without subjecting the shaft to loads in excess of its designed load limits.

Returning now to FIG. 2, the reaction lug 69 and its adjacent reaction pin 79 are selectively positioned in accordance with the above description to localize the torque reaction forces imposed on the speed reducer housing during operation. Thus the radial positions of the reaction pin 79 and the reaction lug 69 are selected so that both members intersect a plane which is parallel to the axial plane of the chain force and which is located at a perpendicular distance (X) from the axis of the speed reducer output shaft equal to the pitch radius of the sprocket 61, R, multiplied by the factor $$R \left( \frac{G.R. - 1}{G.R.} \right)$$

Both members are axially positioned so that they intersect the transverse plane of the chain force, i.e. that plane containing the chain force which is normal to the axis of the motor output shaft. Further, the horizontal surface A of the reaction lug 69 that will abut the reaction pin 79 during operation of the speed reducer preferably lies in a plane perpendicular to the extended center line C—C of the chain strand. When thus positioned, the reaction pin 79 and the reaction lug 69 cooperate to localize the torque reaction forces imposed on the speed reducer housing to develop therebetween a reaction force which will substantially counterbalance the load imposed on the motor shaft during clockwise rotation (looking towards the speed reducer rear cover) of the shaft. Reaction lug 68 and reaction pin 78 are similarly positioned to produce this effect during counterclockwise rotation (looking towards the speed reducer rear cover) of the motor shaft.

As indicated above, the torque reaction localizing means may be precisely positioned in accordance with this invention so as to develop a reaction force, $F_r$, which will be exactly equal in magnitude but opposite in direction to the chain force, $F_c$. In many instances, however, such accurate balance between the $F_r$ and $F_c$ is not necessary and most motors will be able to withstand some degree of imbalance between these two forces without overstressing the output shaft and its supporting structure. Consequently, the phrase "substantially counterbalance" as used in the claims is defined to refer to positioning the torque reaction localizing means at both the precise position described above which will develop a reaction force exactly equal in magnitude to the chain force and also at positions which will develop a reaction force of sufficient magnitude to counteract the chain force to the degree necessary to prevent loading the motor shaft on which the speed reducer is mounted in excess of its design stress limitations. Thus the reaction force developed by the torque reaction localizing means need not be exactly coplanar with the chain force, nor exactly equal in magnitude to the chain force, nor exactly parallel to the chain force, nor developed at precisely the radial and axial position described above in order to practice this invention. Hence the phrase "substantially counterbalance" is used to cover arranging the torque reaction localizing means at positions other than that described above but which are still within the scope of this invention.

FIG. 4 shows an alternate embodiment for a reaction pin that is adapted to cause the motor to stop when the force developed between the reaction lug and the reaction pin reaches a pre-selected magnitude. In this embodiment, the reaction pin assembly 84 comprises a plunger 85 slidably mounted in housing 86 and biased by a spring 87 that is held in place between an end portion 88 of the housing 86 and an annular shoulder 89 formed on the plunger 85. The housing 86 is mounted on a bracket 90 which may be attached to the motor mount 70 to position the reaction pin assembly 84 in accordance with the preceding description. The housing 86 is further arranged so that the plunger 85 may actuate a switch 91, which may also be mounted on the bracket 90, connected by a conductor 92 to the power source, not shown, of the motor 12, upon upward movement of the plunger. Through appropriate selection of the spring 87, the load required to move the plunger against the spring action so as to actuate the switch 91 to dsconnect the electrical power source from the motor may be controlled. This embodiment of the reaction pin therefore provides means to stop the motor at pre-selected load limits to prevent damage to the motor, speed reducer or driven equipment due to momentary overloads. If an internal combustion engine, rather than an electric motor, is used with the speed reducer the reaction pin may be adapted to control the fuel supply to stop the engine and those skilled in the art may readily make such modifications as are necessary.

The speed reducer illustrated in the drawings is also adapted to facilitate changes in the high speed gear set, i.e. the high speed pinion 22 and the high speed gear 33 shown in FIG. 1, should a change in speed reduction ratio be desired. Thus the front cover 63 of the speed reducer 10 may be removed and the high speed pinion and gear changed to provide a different ratio. This change may be readily accomplished without disturbing the speed reducer or its mounting, which may be of considerable importance in many installations.

This invention thus provides for mounting a speed reducer directly on the output shaft of a motor without overstressing the shaft and its supporting structure and without necessitating cumbersome support structure for the speed reducer and represents a novel utilization of the dynamic forces developed during speed reducer operation to accomplish its purposes. The invention may be adapted to a variety of speed reducer installations and those skilled in the art will be able to devise various embodiments of this invention other than that specifically described herein and yet remain within the scope of the invention as defined in the claims. As an example, although the drawings show the torque reaction localizing means arranged between the motor and the speed reducer, it would also be possible to arrange said means at other positions, as for example at the front end of the speed reducer, and yet remain within the true spirit and scope of this invention.

The invention claimed is:

1. In a power transmission of the type comprising a motor with a rotatable motor output shaft, a speed reducer and power take-off means; said speed reducer comprising an input shaft adapted for mounting on the motor output shaft, an output shaft interconnected to the input shaft through speed change gearing which has an overall speed reduction ratio of G.R., a housing enclosing the gearing with a portion of the output shaft projecting through the housing; said power takeoff means including a chain sprocket with a pitch radius of R attached to the projecting portion of the speed reducer output shaft in driving engagement therewith and a chain arranged over the chain sprocket for the transmission of an output force with a line of action lying in a vertical plane substantially perpendicular to the axis of the speed reducer output shaft and in an axial plane spaced from the axis of the speed reducer output shaft, said output force thereby imposing a bending moment on the motor output shaft; the combination with said power transmission of a motor mount comprising a base portion upon which the motor rests and a vertical portion positioned between the speed reducer and the motor, said vertical portion having an aperture for the passage therethrough of the motor output shaft; and torque reaction localizing means comprising a first member attached to the speed reducer housing and a second member attached to the vertical portion of the motor mount, the radial positions of the two members being selected so that both intersect a plane that is parallel to the aforesaid axial plane of the output force and spaced from the axis of the speed reducer output shaft at a perpendicular distance substantially equal to $$R\left(\frac{G.R.-1}{G.R.}\right)$$

and the axial positions of the two members being selected so that both intersect the aforesaid vertical plane of the output force, said members thereby being arranged to localize therebetween the torque reaction forces exerted upon the speed reducer housing during operation of the power transmission so as to develop a force that will substantially counterbalance the bending moment imposed upon the motor output shaft by the output force.

2. A power transmission according to claim 1 wherein the second member attached to the vertical portion of the motor mount is adapted to cause the motor to stop when the force developed between the first and second members reaches a pre-selected magnitude.

3. In a power transmission of the type comprising a motor with a rotatable motor output shaft, a speed reducer and power take-off means; said speed reducer comprising an input shaft adapted for mounting on the motor output shaft, an output shaft interconnected to the input shaft through speed change gearing which has an overall speed reduction ratio of G.R., a housing enclosing the gearing with a portion of the output shaft projecting through the housing; said power take-off means including a member with a pitch radius of R attached to the projecting portion of the speed reducer output shaft in driving engagement therewith for the transmission of an output force with a line of action lying in a vertical plane substantially perpendicular to the axis of the speer reducer output shaft and in an axial plane spaced from the axis of the speed reducer output shaft, said output force thereby imposing a bending moment on the motor output shaft during operation of the power transmission; the combination with said power transmission of a motor mount comprising a base portion upon which the motor rests and a vertical portion positioned between the speed reducer and the motor, said vertical portion having an aperture for the passage therethrough of the motor output shaft; and torque reaction localizing means comprising a first member attached to the speed reducer housing and a second member attached to the vertical portion of the motor mount, the radial positions of the two members being selected so that both intersect a plane that is parallel to the aforesaid axial plane of the output force and spaced from the axis of the speed reducer output shaft at a perpendicular distance substantially equal to $$R\left(\frac{G.R.-1}{G.R.}\right)$$

and the axial positions of the two members being selected so that both intersect the aforesaid vertical plane of the output force, said members thereby being arranged to localize therebetween the torque reaction forces exerted upon the speed reducer housing during operation of the power transmission so as to develop a force that will substantially counterbalance the bending moment imposed upon the motor output shaft by the output force.

4. In a power transmission of the type comprising a motor with a rotatable motor output shaft, a speed reducer and power take-off means; said speed reducer comprising an input shaft adapted for mounting on the motor output shaft, an output shaft interconnected to the input shaft through speed change gearing, a housing enclosing the gearing with a portion of the output shaft projecting through the housing; and said power take-off means being attached to the projecting portion of the output shaft of the speed reducer for driving engagement therewith and being of the type which transmits an output force that imposes a bending moment on the motor output shaft during operation of the power transmission; the combination with said power transmission of a motor mount comprising a base portion upon which the motor rests and a vertical portion positioned between the speed reducer and the motor, said vertical portion having an aperture to permit the passage therethrough of the motor output shaft; and torque reaction localizing means comprising a first member attached to the speed reducer and a second member attached to the vertical portion of the motor mount, said first and second members being selectively arranged to localize therebetween the torque reaction forces exerted upon the speed reducer housing during operation of the power transmission so as to develop a force substantially equal in magnitude but opposite in direction and substantially coplanar to the output force set up in the power take-off means during operation of the power transmission to substantially counterbalance the bending moment imposed upon the motor output shaft by the latter force.

5. In a power transmission of the type comprising a motor with a rotatable motor output shaft, a speed reducer and power take-off means; said speed reducer comprising an input shaft adapted for mounting on the motor output shaft, an output shaft interconnected to the input shaft through speed change gearing, a housing enclosing the gearing with a portion of the output shaft projecting through the housing; and said power take-off means being attached to the projecting portion of the output shaft of the speed reducer for driving engagement therewith and being of the type which transmits an output force that imposes a bending moment on the motor output shaft during operation of the power transmission; the combination with said power transmission of torque reaction localizing means comprising a first member attached to the speed reducer and a second member attached to the motor, said first and second members being selectively arranged to localize therebetween the torque reaction forces exerted upon the speed reducer housing during operation of the power transmission so as to develop a force substantially equal in magnitude but opposite in direction and substantially coplanar to the output force set up in the power take-off means during operation of the power transmission to substantially counterbalance the bending moment imposed upon the motor output shaft by the latter force.

6. In a power transmission of the type comprising a motor with a rotatable motor output shaft, a speed reducer and power take-off means; said speed reducer comprising an input shaft adapted for mounting on the motor output shaft, an output shaft interconnected to the input shaft through speed changing gearing, a housing enclosing the gearing with a portion of the output shaft projecting through the housing; and said power take-off means attached to the projecting portion of the output shaft of the speed reducer for driving engagement therewith and being of the type which transmits an output force that imposes a bending moment on the motor output shaft during operation of the power transmission; the combination with said power transmission of torque reaction localizing means comprising a first member attached to the speed reducer and a second member attached to the motor, said first and second members being selectively arranged to localize therebetween the torque reaction forces exerted upon the speed reducer housing during operation of the power transmission so as to develop a force that will substantially counterbalance the output force set up in the power take-off means during operation of the power transmission.

7. A power transmission according to claim 6 wherein the second member is adapted to cause the motor to stop when the force developed between the first and second members reaches a preselected magnitude.

8. In a power transmission of the type comprising a motor with a rotatable motor output shaft, a speed reducer and power take-off means; said speed reducer comprising an input shaft adapted for mounting on the motor output shaft, an output shaft interconnected to the input shaft through speed change gearing, a housing enclosing the gearing with a portion of the output shaft projecting from the housing; and said power take-off means being attached to the projecting portion of the output shaft of the speed reducer for driving engagement therewith and being of the type which transmits an output force that imposes a bending moment on the motor output shaft during operation of the power transmission; the combination with said power transmission of torque reaction localizing means arranged to localize the torque reaction forces exerted upon the speed reducer housing during operation of the power transmission so as to substantially counterbalance the bending moment imposed upon the motor output shaft during rotation of the power take-off means.

9. In a power transmission of the type comprising a motor with a rotatable motor output shaft and a speed reducer, said speed reducer comprising an input shaft adapted for mounting on the motor output shaft, an output shaft interconnected to the input shaft through speed change gearing, a housing enclosing the gearing with a portion of the output shaft projecting from the housing and adapted for the attachment of power take-off means of the type which transmits an output force that imposes a bending moment on the motor output shaft during operation of the power transmission, the combination with said power transmission of a motor mount comprising a base portion upon which the motor rests and a vertical portion positioned between the speed reducer and the motor, said vertical portion having an aperture to permit passage therethrough of the motor output shaft; and torque reaction localizing means comprising a first member attached to the speed reducer and a second member attached to the vertical portion of said motor mount, said first and second members being selectively arranged to localize therebetween the torque reaction forces exerted upon the speed reducer housing during operation so as to substantially counterbalance the bending moment imposed upon the motor output shaft by the output force during operation of the power transmission.

10. In a power transmission of the type comprising a motor with a rotatable output shaft and a speed reducer, said speed reducer comprising an input shaft adapted for mounting on the motor output shaft, an output shaft interconnected to the input shaft through speed change gearing, a housing enclosing the gearing with a portion of the output shaft projecting from the housing and adapted for the attachment of power take-off means of the type which transmits an output force that imposes a bending moment on the motor output shaft during operation of the power transmission, the combination with said power transmission of torque reaction localizing means comprising a first member attached to the speed reducer and a second member attached to the motor, said first and second members being selectively arranged to localize therebetween the torque reaction forces exerted upon the speed reducer housing during operation of the power transmisison so as to develop a force substantially equal in magnitude but opposite in direction and substantially coplanar to the output force set up in the power take-off means during operation of the power transmission to substantially counterbalance the bending moment imposed upon the motor output shaft by the latter force.

11. In a power transmission of the type comprising a motor with a rotatable motor output shaft and a speed reducer, said speed reducer comprising an input shaft adapted for mounting on the motor output shaft, an output shaft interconnected to the input shaft through speed change gearing, a housing enclosing the gearing with a portion of the output shaft projecting from the housing and adapted for the attachment of power take-off means of the type which transmits an output force that imposes a bending moment on the motor output shaft during operation of the power transmission, the combination with said power transmission of torque reaction localizing means comprising a first member attached to the speed reducer and a second member attached to the motor, said first and second members being selectively arranged to localize therebetween the torque reaction forces exerted upon the speed reducer housing during operation of the power transmission so as to develop a force substantially equal in magnitude but opposite in direction to the output force set up in the power take-off means during operation of the power transmission to substantially counterbalance the bending moment imposed upon the motor output shaft by the latter force.

12. In a power transmission of the type comprising a motor with a rotatable motor output shaft and a speed reducer, said speed reducer comprising an input shaft adapted for mounting on the motor output shaft, an output shaft interconnected to the input shaft through speed change gearing, a housing enclosing the gearing with a portion of the output shaft projecting from the housing and adapted for the attachment of power take-off means of the type which transmits an output force that imposes a bending moment on the motor output shaft during operation of the power transmission, the combination with said power transmission of torque reaction localizing means comprising a first member attached to the speed reducer and a second member attached to the motor, said first and second members being selectively arranged to localize therebetween the torque reaction forces exerted upon the speed reducer housing during operation of the power transmission so as to substantially counterbalance the bending moment imposed upon the motor output shaft during rotation of the power take-off means attached to the speed reducer output shaft.

13. A power transmission according to claim 12 wherein one of said first and second members is arranged to cause the motor to stop when the force developed between the first and second members reaches a preselected magnitude.

14. A power transmission according to claim 12 wherein the second member is arranged to cause the motor to stop when the force developed between the first and second members reaches a preselected magnitude.

15. In a power transmission of the type comprising a motor with a rotatable motor output shaft and a speed reducer, said speed reducer comprising an input shaft adapted for mounting on the motor output shaft, an output shaft interconnected to the input shaft through speed change bearing, a housing enclosing the gearing with a portion of the output shaft projecting from the housing and adapted for the attachment of power take-off means of the type which transmits an output force that imposes a bending moment on the motor output shaft during operation of the power transmission, the combination with said power transmission of torque reaction localizing means arranged to localize the torque reaction forces exerted upon the speed reducer housing during operation of the power transmission so as to substantially counterbalance the bending moment imposed upon the motor output shaft during rotation of the power take-off means attached to the speed reducer output shaft.

16. In a speed reducer of the type comprising an input shaft adapted for mounting on a motor output shaft, an output shaft interconnected to the input shaft through speed change gearing which has an overall speed reduction ratio of G.R., a housing enclosing the gearing with a portion of the output shaft projecting from the housing and adapted for the attachment of power take-off means having a pitch radius of R for transmission therethrough of an output force with a line of action lying in a vertical plane substantially perpendicular to the axis of the output shaft and in an axial plane spaced from the axis of the output shaft, which output force imposes a bending moment on the motor output shaft during operation of the speed reducer, the combination with said speed reducer of a reaction torque localizing member selectively radially positioned on an external portion of said housing to intersect a plane that is parallel to the aforesaid axial plane of the output force and spaced at a perpendicular distance from the axis of the speed reducer output shaft substantially equal to the quantity $$R\left(\frac{G.R.-1}{G.R.}\right)$$

and axially positioned along said housing to intersect the aforesaid vertical plane of the output force.

17. In a speed reducer of the type comprising an input shaft adapted for mounting on a motor output shaft, an output shaft interconnected to the input shaft through speed change gearing which has an overall speed reduction ratio of G.R., a housing enclosing the gearing with a portion of the output shaft projecting from the housing and adapted for the attachment of power take-off means having a pitch radius of R for transmission therethrough of an output force with a line of action lying in a vertical plane substantially perpendicular to the axis of the output shaft and in an axial plane spaced from the axis of the output shaft, which output force imposes a bending moment on the motor output shaft during operation of the speed reducer, the combination wtih said speed reducer of a reaction torque localizing member selectively radially positioned on an external portion of said housing to intersect a plane that is parallel to the aforesaid axial plane of the output force and spaced at a perpendicular distance from the axis of the speed reducer output shaft substantially equal to the quantity $$R\left(\frac{G.R.-1}{G.R.}\right)$$

and axially positioned along said housing to intersect the aforesaid vertical plane of the output force, said member being attached to an arcuate flange secured to the speed reducer housing.

18. A speed reducer according to claim 17 wherein said arcuate flange may be attached in a plurality of preselected positions.

19. In a speed reducer of the type comprising an input shaft adapted for mounting on a motor output shaft, an output shaft interconnected to the input shaft through speed change gearing, a housing enclosing the gearing with a portion of the output shaft projecting from the housing and adapted for the attachment of power take-off means of the type which transmits an output force that imposes a bending moment on the motor output shaft during operation of the speed reducer, the combination with said speed reducer of a reaction torque localizing member selectively positioned on an external portion of said housing to co-act with a stationarily mounted member to localize therebetween the torque reaction forces exerted upon the speed reducer housing during operation to substantially counterbalance the bending moment imposed upon a motor output shaft on which the speed reducer may be mounted.

References Cited by the Examiner

UNITED STATES PATENTS

| 2,908,853 | 10/59 | Laky et al. | 318—475 |
| 3,000,229 | 9/61 | Christian | 74—411 X |

FOREIGN PATENTS

| 874,884 | 3/42 | France. |

MILTON O. HIRSHFIELD, *Primary Examiner.*